May 20, 1952 J. B. H. KUPER ET AL 2,597,340
ULTRAHIGH-FREQUENCY NOISE GENERATOR
Filed June 23, 1945
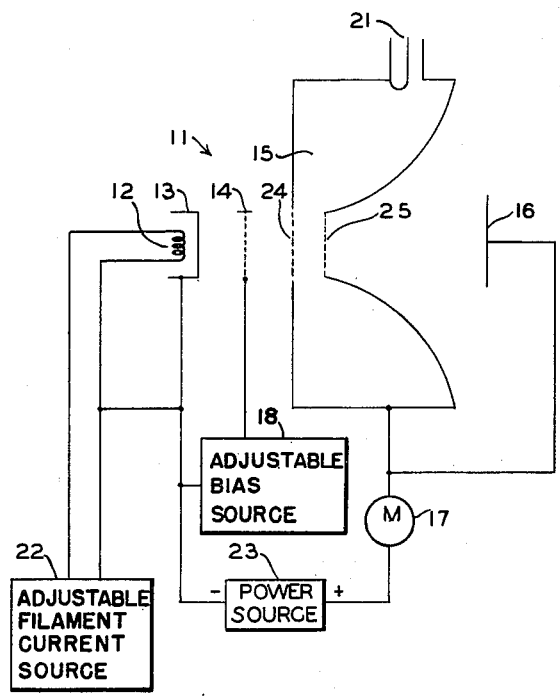
INVENTOR.
JAMES B.H. KUPER
BY MAYNARD C. WALTZ
ATTORNEY Patented May 20, 1952

2,597,340

UNITED STATES PATENT OFFICE 2,597,340

ULTRAHIGH-FREQUENCY NOISE GENERATOR

James B. H. Kuper, Redding, Conn., and Maynard C. Waltz, Damariscotta, Maine, assignors, by mesne assignments, to the United States of America as represented by the Secretary of War Application June 23, 1945, Serial No. 601,120

5 Claims. (Cl. 315—5)

This invention relates to radio apparatus and more particularly to signal generators.

According to conventional practice signal generators are employed in the signal tracing method of trouble-shooting electrical equipment. In certain electronic equipment such as radar or other radio locator equipment, extremely high-gain receivers are employed. In such equipment many tests may be made by observing the noise output of the receiver. However, as is well understood in the art, this noise originates in the initial stages of the receiver and if trouble develops in these stages no source of noise exists which may be used in isolating the trouble. Various components of the system may also be tested independently by use of signal generators, for example components such as crystals, R.-F. lines, and so forth. Signal generators used heretofore have required extensive calibration or elaborate auxiliary power measuring devices for determining the power output thereof.

An object of the present invention is, therefore, to provide an ultra-high frequency noise generator for use in testing ultra-high frequency systems.

A further object of the present invention is to provide an ultra-high frequency noise generator, the output of which is easily calibrated.

For a better understanding of the invention, together with other and further objects thereof, reference is had to the following description taken in connection with the accompanying drawing which shows in diagrammatic form a preferred embodiment of the invention using a reflex type "Klystron."

Although the tube illustrated in the drawing is a "Klystron," it may be any one of several other reflex type velocity-modulated tubes, and this invention is, therefore, not to be limited to the specific use of Klystrons. The apparatus as shown comprises a tube 11 having a heater 12, cathode 13, control grid 14, cavity resonator 15, and an electrode 16 ordinarily known as a reflector which is the designation employed hereinafter. The cavity 15 is provided with an output coupling loop 21. The term "cavity" is employed herein to designate not only the actual cavity but also the structural elements which define this inclosed space. A filament power source 22 is connected to the heater 12 for energizing the same, while plate power source 23 is connected between the cathode 13 and the cavity 15. A meter 17 is inserted in series with the cavity 15 and indicates the cavity current. One side of the heater 12 is electrically connected to the cathode 13 while the reflector 16 is electrically connected to the cavity 15. A bias source 18 connects the control grid 14 to the cathode 13.

In the operation of this circuit as a noise generator the cavity 15 is tuned in a manner well known in the art to the desired frequency. The heater 12 heats the cathode 13 and causes it to emit electrons in a random fashion. The cavity 15 and reflector 16, being held positive with respect to the cathode 13 by the source 23, will attract the emitted electrons, that is, will prevent the reflection of any electrons. The Klystron is thus biased to a point below that necessary for continuous oscillations.

Upon arrival at the cavity 15 the electrons from the cathode 13 will have attained considerable velocity due to the cavity potential. Because of their inertia resulting from this velocity, they are not wholly collected on the first grid structure 24, but, in part, pass through this grid 24 and for the same reason may pass through the second grid structure 25 and be ultimately collected by the reflector 16. Since the emission from the cathode is wholly random, the voltages induced in the cavity by those electrons which pass through it are also random. Those induced voltages having the proper time duration produce oscillation of the cavity 15 at and near the resonant frequency of the cavity 15. These completely random oscillations are available at the output 21 as noise. To vary the amplitude of the noise output, the potential on the grid 14 is varied, thus controlling the total number of electrons which strike the cavity and reflector. An alternate method of controlling the power output of the generator is to connect the control grid 14 directly to the cathode 13 and vary the electron current by varying the cathode temperature. The output of this generator has been found to be directly proportional to the cavity current. Therefore, the output need be measured for only one value of current an indicated by the meter 17. Other outputs may then be determined from the meter reading. It has also been found that such calibration is very dependable over long periods of time. As before stated, the principles herein set forth may be applied equally well to other velocity-modulated tubes.

While there has been described what is at present considered the preferred embodiment of the invention, it will be obvious to those skilled in the art that various changes and modifications may be made therein without departing from the invention.

What is claimed is:

1. A source of spurious oscillations in the ultra-high frequency band for use in connection with a source of heater power, a plate voltage source, and a bias source: said source of spurious oscillations comprising a velocity-modulated tube having a heater, a cathode, a control grid, a cavity resonator, a reflector type element, and an output coupling, said heater being connected to be energized by said heater source, said cathode together with one terminal of said heater being connected to the negative terminal of said plate voltage source, said control grid being connected to said bias source, said reflector and cavity resonator being tied together and connected to a positive terminal of said plate voltage source, whereby a bias for said tube is obtained at a point below that necessary for continuous oscillation, reflection of electrons from said reflector is prevented, said tube is operated as a diode and there is made available at said output coupling a noise signal at substantially the resonant frequency of said cavity resonator.

2. A source of spurious oscillations in the ultra-high frequency band according to claim 1, further including means coupled to said tube for varying the amplitude of the noise output thereof.

3. A source of spurious oscillations in the ultra-high frequency band according to claim 2, wherein said amplitude varying means comprises grid potential adjustment means.

4. A source of spurious oscillations in the ultra-high frequency band for use in conjunction with a source of heater power and a plate voltage source: said source of spurious oscillations comprising a velocity-modulated tube having a heater, a cathode, a control grid, a cavity resonator, a reflector, and an output coupling, said heater being connected to be energized by said heater source, said cathode and control grid being connected to a negative terminal of said plate voltage source, said reflector and cavity resonator being tied together and connected to a positive terminal of said plate voltage source, whereby a bias for said tube is obtained at a point below that necessary for continuous oscillation, reflection from said reflector is prevented, said tube is operated as a diode, and there is made available at said output coupling a noise signal at substantially the resonant frequency of said cavity resonator.

5. A source of spurious oscillations in the ultra-high frequency band according to claim 4, further including means for varying the amplitude of the noise output of said tube comprising means in circuit with said heater for adjusting the temperature of said cathode.

JAMES B. H. KUPER.
MAYNARD C. WALTZ.

REFERENCES CITED

The following references are of record in the file of this patent:

UNITED STATES PATENTS

| Number | Name | Date |
|---|---|---|
| 2,278,210 | Morton | Mar. 31, 1942 |
| 2,293,387 | Haeff | Aug. 18, 1942 |
| 2,329,780 | Zalesak | Sept. 21, 1943 |

OTHER REFERENCES

Scien. American, Feb. 1945, p. 64.